(12) United States Patent
Nishida (10) Patent No.: US 10,539,987 B2
(45) Date of Patent: Jan. 21, 2020

(54) DOCUMENT READING APPARATUS AND IMAGE FORMING APPARATUS

(71) Applicant: KYOCERA Document Solutions Inc., Osaka (JP)

(72) Inventor: Atsushi Nishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/885,146

(22) Filed: Jan. 31, 2018

(65) Prior Publication Data

US 2018/0217647 A1    Aug. 2, 2018

(30) Foreign Application Priority Data

Jan. 31, 2017    (JP) .................................. 2017-015347

(51) Int. Cl.
| | | |
|---|---|---|
| *H04N 1/047* | (2006.01) | |
| *H04N 1/12* | (2006.01) | |
| *H04N 1/00* | (2006.01) | |
| *G06F 1/20* | (2006.01) | |

(52) U.S. Cl.
CPC ............. *G06F 1/206* (2013.01); *H04N 1/047* (2013.01); *H04N 1/12* (2013.01)

(58) Field of Classification Search
None
See application file for complete search history.

(56) References Cited

U.S. PATENT DOCUMENTS 5,172,159 A * 12/1992 Nakagama ............. G03B 27/52
                                                                355/30
5,351,114 A *  9/1994 Matsuno ............ G03G 15/2064
                                                                399/307
(Continued)

FOREIGN PATENT DOCUMENTS

JP      60-198530   * 10/1985   ............. G03B 27/34
JP    H08-305229 A    1/1996
(Continued)

OTHER PUBLICATIONS

Japan Patent Office. Office Action of foreign counterpart. dated Aug. 20, 2019.

*Primary Examiner* — Beniyam Menberu
(74) *Attorney, Agent, or Firm* — Hawaii Patent Services; Nathaniel K. Fedde; Kenton N. Fedde (57) ABSTRACT

Provided is a document reading apparatus capable of preventing erasure of print information printed with erasable ink. If the document reading apparatus accepts a document reading instruction in a state where a plurality of documents are stacked in the document stacking tray, this apparatus causes a document feeding section to successively feed the documents one by one. This apparatus further includes a temperature sensor detecting the temperature of a document feeding path along which the document is fed by the document feeding section as a monitoring temperature and a document reading control section which interrupts the document reading operation until the monitoring temperature falls below a restart temperature threshold set to be equal to or lower than the interruption temperature threshold value when the temperature threshold value is exceeded.

9 Claims, 7 Drawing Sheets

(56) References Cited

U.S. PATENT DOCUMENTS

| | | | | |
|---|---|---|---|---|
| 5,432,580 | A * | 7/1995 | Tokuda | G03B 27/32 |
| | | | | 355/27 |
| 9,341,998 | B2 * | 5/2016 | Katayama | G06K 15/14 |
| 2002/0056804 | A1 * | 5/2002 | Konagaya | H04N 1/00013 |
| | | | | 250/208.1 |
| 2013/0003147 | A1 * | 1/2013 | Shimatani | G03G 15/602 |
| | | | | 358/505 |
| 2015/0234328 | A1 * | 8/2015 | Imamiya | H04N 1/32101 |
| | | | | 399/69 |
| 2015/0248086 | A1 * | 9/2015 | Katayama | G03G 15/2039 |
| | | | | 347/179 |
| 2017/0094093 | A1 * | 3/2017 | Mori | H04N 1/0464 |

FOREIGN PATENT DOCUMENTS

| | | | | |
|---|---|---|---|---|
| JP | 2000-305325 | * | 11/2000 | G03G 15/00 |
| JP | 2001-016373 | * | 1/2001 | H04N 1/00 |
| JP | 2014-044275 A | | 3/2014 | |
| JP | 2014-137393 A | | 7/2014 | |
| JP | 2015-052639 A | | 3/2015 | |
| JP | 2016-090517 A | | 5/2016 | |

\* cited by examiner

The temperature of decoloring ink is close to the decoloring temperature causes the reading interval to extend for the suppression of temperature rise of the document reading section.

If the number of remaining sheets of document is n or less or if no decoloring ink is used for the documents, manipulate below [EXECUTE].

[EXECUTE] — 73

The temperature of decoloring ink is close to the decoloring temperature causes the reading interrupt.

If no decoloring ink is used for the documents, manipulate below [EXECUTE].

EXECUTE — 73

72

DOCUMENT READING APPARATUS AND IMAGE FORMING APPARATUS

INCORPORATION BY REFERENCE

This application is based on and claims the benefit of priority from Japanese Patent Application No. 2017-015347 filed on Jan. 31, 2017 the contents of which are hereby incorporated by reference.

BACKGROUND

The present disclosure relates to a document reading apparatus including a document feeding section that feeds documents one by one and a document reading section that reads a document fed by the document feeding section, and an image forming apparatus including the document reading apparatus.

In recent years, a technique has been proposed in which information is printed on recording paper using erasable ink that decolorizes at a temperature equal to or higher than a specified temperature (for example, 60 degrees in Celsius or above). As for the print information formed using erasable ink, if the print information becomes unnecessary, it is possible to erase the print information by applying heat to the recording paper.

SUMMARY

A document reading apparatus according to the present disclosure includes a document reading section reading print information on documents and a document feeding section feeding the documents stacked in a document stacking tray, in a one-by-one manner, to the document reading section. The document reading apparatus, when accepting a document reading instruction in a state where the documents are stacked in the document stacking tray, conducts an execution of a document reading operation in a successive manner by causing the document feeding section to feed a sheet of document to undergo reading operation of the document reading section. In addition, the document reading apparatus further includes a temperature sensor that detects a temperature of a document feeding path along which the document moves that is fed by the document feeding section as a monitoring temperature, and a document reading control section causing an interruption of the document reading operation, if the monitoring temperature becomes equal to or more than an interruption temperature threshold value that is set less than a color erasing temperature of erasable ink, until the monitoring temperature becomes less than a restart temperature threshold value that is set to be equal to or less than the interruption temperature threshold value.

An image forming apparatus of the present disclosure includes the above-mentioned document reading apparatus and an image generation section that forms an image based on image data acquired by the document reading apparatus.

DETAILED DESCRIPTION

Hereinafter, embodiments of the present disclosure will be described in detail below with reference to the attached drawings. In the following embodiments, the same reference codes are given to the configurations showing similar functions.

Figure 1:
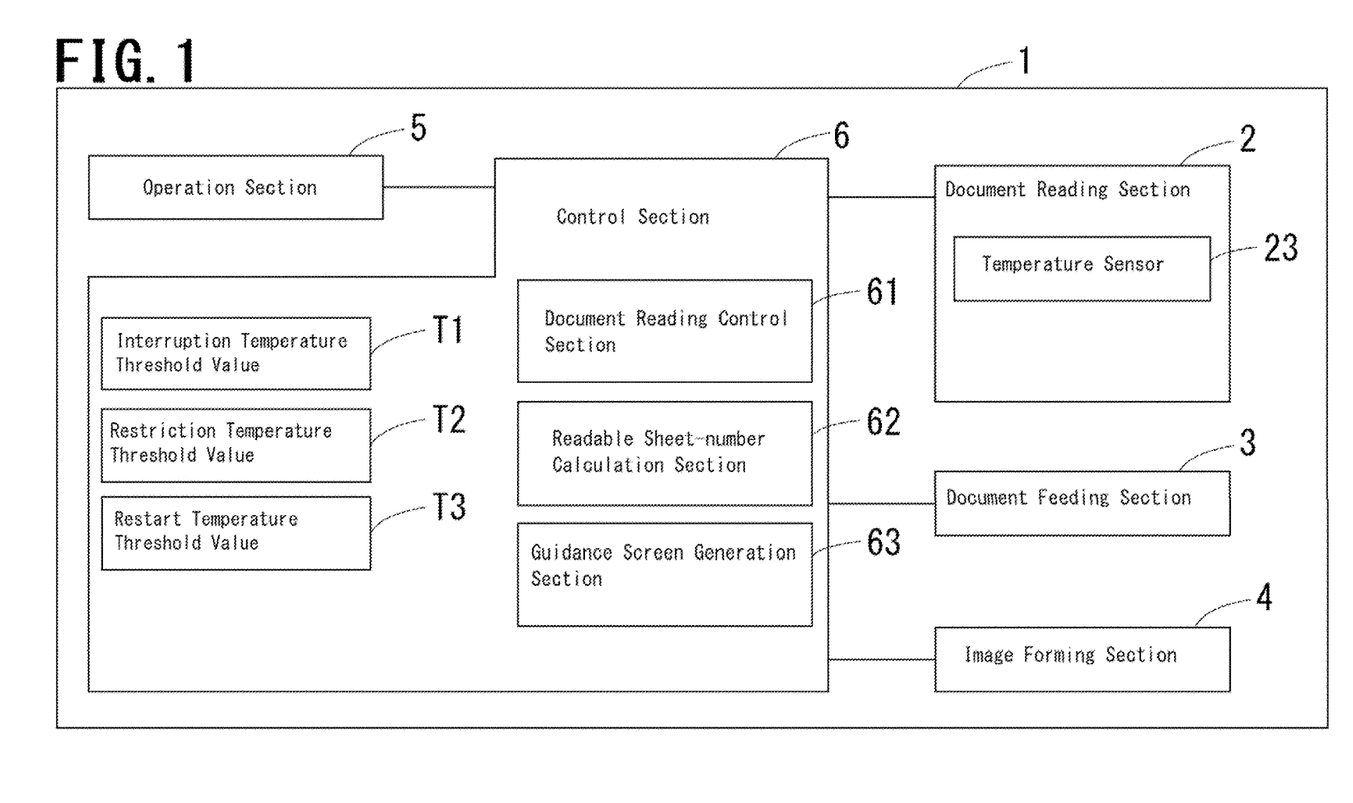
FIG. 1 is a block diagram showing a schematic configuration of an embodiment of an image forming apparatus according to the present disclosure.

Referring to FIG. 1, an image forming apparatus 1 of the present embodiment includes a document reading section 2, a document feeding section 3, an image forming section 4, an operation section 5 and a control section 6, and the control section 6 controls each of the other sections.

Figure 2:
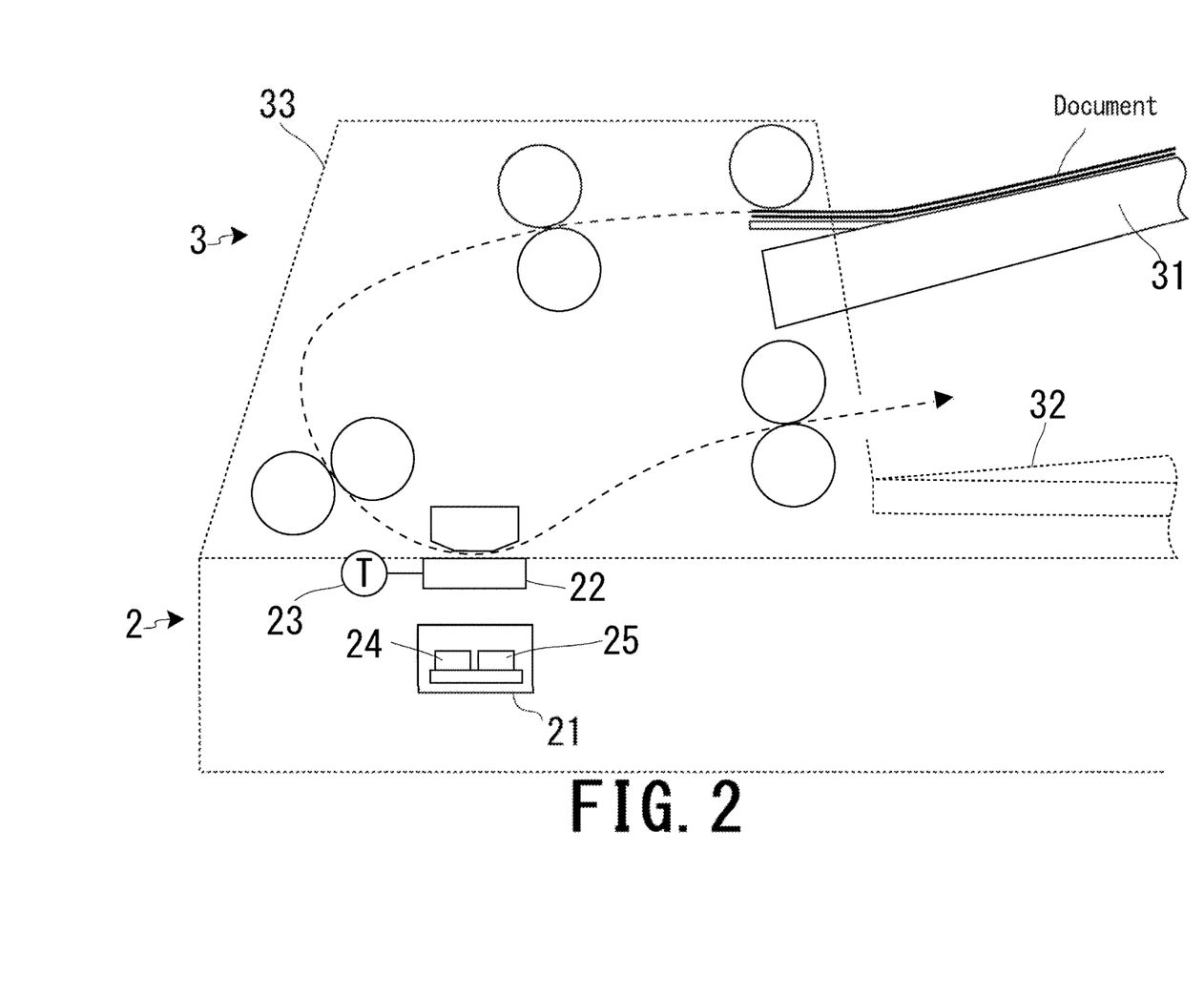
FIG. 2 is a schematically illustrated side sectional view of an internal configuration of each of the document feeding section and the document reading section which are shown in FIG. 1.

Referring to FIG. 2, the document reading section 2 includes a scanner 21, a slit plate 22, and a temperature sensor 23. The scanner 21 includes a light source 24 using an LED or the like, and a line sensor 25, arranged in a main scanning direction, which is made up of CCD, CMOS, or the like. The slit plate 22 is made of a transparent member such as glass formed in a direction orthogonal to the feeding direction of a document by the original feeding portion 3, and print information on the document is to be read through the slit plate 22.

The temperature sensor 23 detects a temperature of the slit plate 22 in a direct or indirect manner. The print information on the document fed by the document feeding section 3 is brought into contact with the slit plate 22. Accordingly, in a case where erasable ink is used for printing, if the temperature of the slit plate 22 becomes equal to or higher than a specified temperature (hereinafter, which will be referred to as "erasing temperature") at which the erasable ink is erased, the printing with erasable ink is feared to be erased. In view of this, in the present embodiment, the temperature sensor 23 detects the temperature of the slit plate 22 as a monitoring temperature T, and the document reading operation is prevented when the monitoring temperature T is equal to or higher than the decoloring temperature.

Referring to FIG. 2, the document feeding section 3, which is in the form of an ADF, includes a document placement tray 31, a document discharge tray 32, and a document feed mechanism 33. The document placement tray 31 is provided with a document detection sensor for detecting the presence or absence of a placed document.

If a reading instruction is issued under a condition that the document detection sensor detects a document, the documents placed on the document placement tray 31 are successively fed out one by one by the document feeding mechanism 33 to a position to be faced with the slit plate 22, and then are discharged to the document discharge tray 32.

Then, the document reading section 2 turns on the light source 24 at a timing when the leading edge of the document reaches the slit plate 22 to start reading the document by the line sensor 25, and turns off the light source 24 at a timing when the trailing end of the document passes through the slit plate 22 The light source 24 is turned off to end the reading of the document by the line sensor 25.

The document feeding mechanism 33 includes rollers, which are rotationally driven by a document feeding motor, such as a pickup roller, a document feeding roller, a registration roller, a document discharge roller, and the like, and a document pressing portion 34. The document pressing portion 34 presses the fed document against the slit plate 22.

The scanner 21, which is so disposed as to face the slit plate 22, acquires image data by reading a document in synchronization with the feeding of the document by the document feeding section 3 via the slit plate 22 and outputs the acquired image data to the image forming section 4.

[0014] The image forming section 4 includes an image forming section that is made up of, for example, a photosensitive drum, a charging section, an exposure section, a developing section, a transfer section, a cleaning section, and a fixing section. The image forming section 4 forms an image based on the image data acquired by the document reading section 2, and records the formed image on a recording paper.

The operation section 5 is made up of various operation keys, a touch panel, and the like which are for providing settings of and operation instructions to the image forming apparatus 1.

The control section 6 is an arithmetic processing circuit such as a microcomputer including a CPU, a ROM, a RAM and the like. In the ROM, a control program for controlling the operation of the image forming apparatus 1 is stored. The CPU of the control section 6 reads the control program stored in the ROM and develops the control program in the RAM so as to control the entire apparatus according to various instruction information input from the operation section 5.

In addition, the control section 6 functions as a document reading control section 61, a readable sheet number calculating section 62, and the guidance screen generating section 63, thereby configuring a document reading device together with the document reading section 2 and the document feeding section 3.

Further, in the ROM (for example, in the control program) of the control section 6, an interruption temperature threshold value T1, a restriction temperature threshold value T2, and a restart temperature threshold value T3 are set as threshold values to be compared with the monitoring temperature T detected by the temperature sensor 23. The interruption temperature threshold value T1 is a threshold value for determining whether to interrupt the document reading operation and is set to be less than the erasing temperature such that the suppression temperature threshold value T1 is so set to be slightly lower than the erasing temperature. The restriction temperature threshold value T2 is a threshold value for determining whether to start an operation to suppress the rise of the monitoring temperature T, and is set to be lower than the suppression temperature threshold value T1. The restart temperature threshold value T 3 is a threshold value for determining whether or not to restart the interrupted document reading operation and is set to be equal to or lower than the interruption temperature threshold value T1.

The document reading control section 61 causes the document feeding section 3 to feed the document and controls the document reading operation that the document reading section 2 reads. If the monitoring temperature T is less than the restriction temperature threshold value T2, the document reading control section 61 executes the next document reading operation at a specified regular interval of time. If the monitoring temperature T is equal to or higher than the restriction temperature threshold value T2 and concurrently is lower than the interruption temperature threshold value T1, the document reading control section 61 executes the next document reading operation at a restriction temperature interval of time that is longer than the regular interval of time. Furthermore, if the monitoring temperature T is equal to or higher than the interruption temperature threshold value T1, an execution of the next document reading operation is interrupted.

If the monitoring temperature T becomes equal to or higher than the restriction temperature threshold value T2, the readable sheet number calculating section 62 counts the number of documents that the monitoring temperature T does not reach the interruption temperature threshold value T1 even though the document reading operation is executed at the regular interval of time as the number of readable sheets. A method of calculating the number of readable sheets will be described later.

The guidance screen generation section 63 generates a guidance screen for notifying the user of the execution of the document reading operation at the restriction temperature interval of time and an interruption of the execution of the document reading operation, and causes the guidance screen on the touch panel of the operation section 5 to display the generated screen.

Next, with reference to FIG. 4 to FIG. 6, a detailed explanation will be made as to a document reading operation for successively reading a plurality of documents stacked in the document stacking tray.

Figure 3:
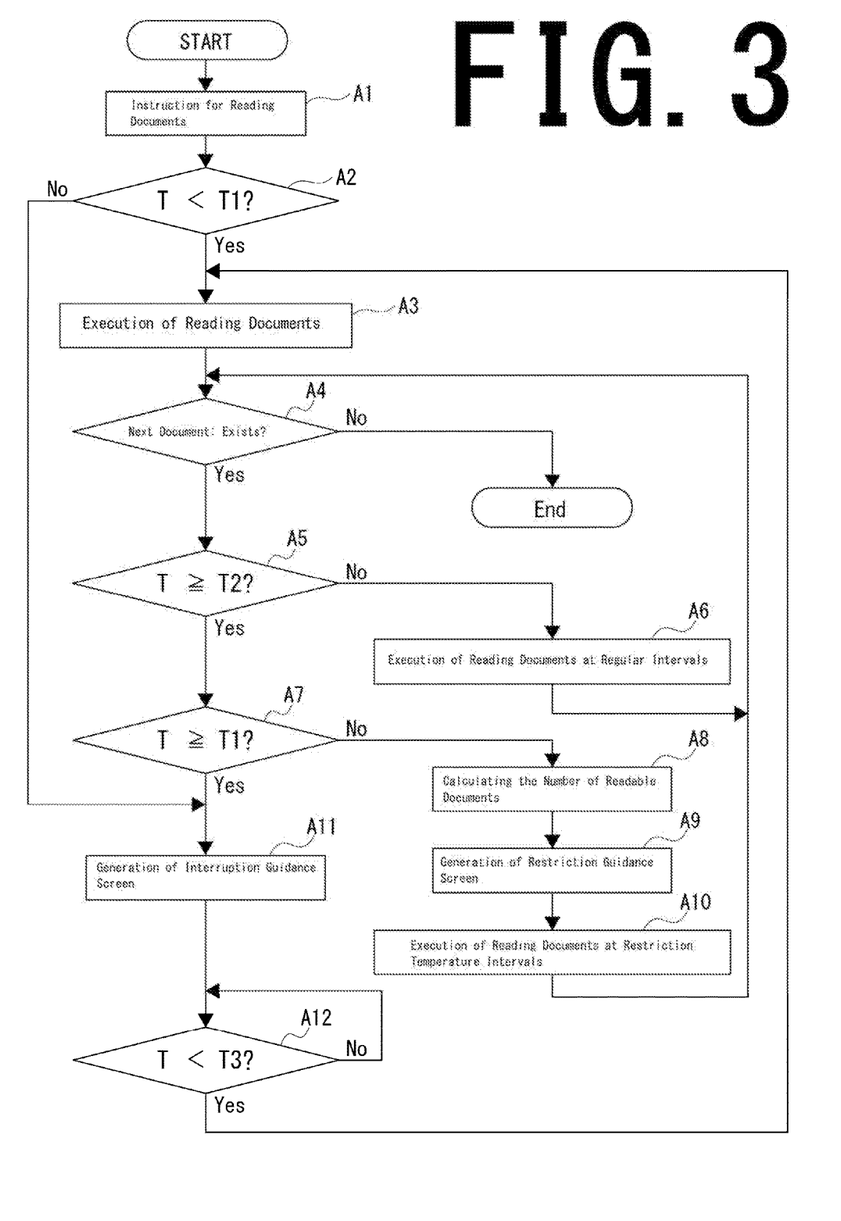
FIG. 3 is a flowchart for explaining a document reading operation when a plurality of documents placed on a document stacking tray shown in FIG. 2 are read in a successive manner.

When a document reading instruction is input from the operation section 5 or the like under a condition that the documents are stacked in the document stacking tray 31 (Step A1), the document reading control section 61 determines whether or not the monitoring temperature T detected by the temperature sensor 23 is less than the restriction temperature threshold value T1 (Step A2).

If the monitoring temperature T is less than the restriction temperature threshold value T1 in Step A2, the document reading control section 61 executes the document reading operation (Step A3).

Next, the document reading control section 61 determines whether or not a next document exists based on the output of the document detection sensor, that is, whether or not the next document is stacked in the document stacking tray 31 (Step A4). If no next document is found to be in existence in Step A4, the document reading control section 61 ends the document reading operation.

If a next document is found to be in existence in Step A4, the document reading control section 61 determines whether or not the monitoring temperature T is equal to or higher than the restriction temperature threshold value T2 (Step A5).

In Step A5, if the monitoring temperature T is less than the restriction temperature threshold value T2, the document reading control section 61 executes the document reading operation for the next document at the regular interval of time (Step A6) and the control returns to Step A4 for determining whether or not a next document exists.

In Step A5, if the monitoring temperature T is equal to or higher than the restriction temperature threshold value T2, the document reading control section 61 determines whether or not the monitoring temperature T is equal to or higher than the interruption temperature threshold value T1 (Step A7).

In Step A7, if the monitoring temperature T is less than the interruption temperature threshold T1, the readable sheet number calculating section 62 calculates the number n of readable sheets (Step A8).

Figure 4:
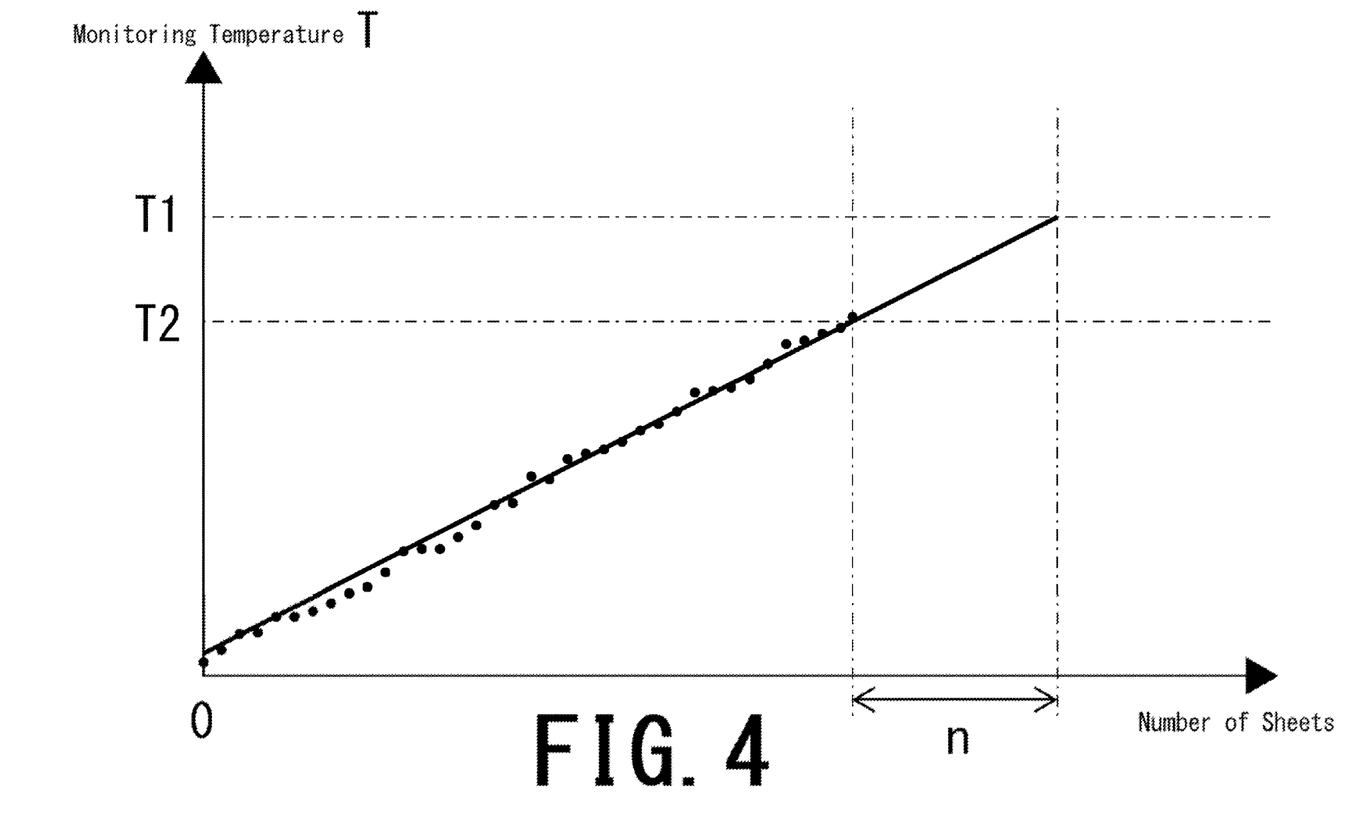
FIG. 4 is a diagram for explaining an example of calculation of the number of sheets that can be read by the readable sheet number calculating section shown in FIG. 1.

If the document reading operation is executed in a successive manner, heat is accumulated due to the feeding documents at the document feeding section 3 and the irradiation of light at the document reading section 2, and as shown in FIG. 4, as the number of sheets to be read increases, the monitoring temperature T rises. Therefore, the readable sheet number calculating section 62 calculates an approximate curve (a linear approximate curve in the example indicated by the solid line in FIG. 4) based on the monitoring temperature T until the interruption temperature threshold T1 is reached. It is to be noted that this calculated approximate curve is a temperature rise prediction curve in the case where the document reading operation is executed successively at the regular interval of time. Then, the readable sheet number calculating section 62 successively executes the document reading operation at the regular interval of time, and if the monitoring temperature T rises along with the calculated approximate curve, calculates the number of sheets by which the monitoring temperature T reaches the interruption temperature threshold value T1 as the number n of the readable sheets.

Figure 5A:
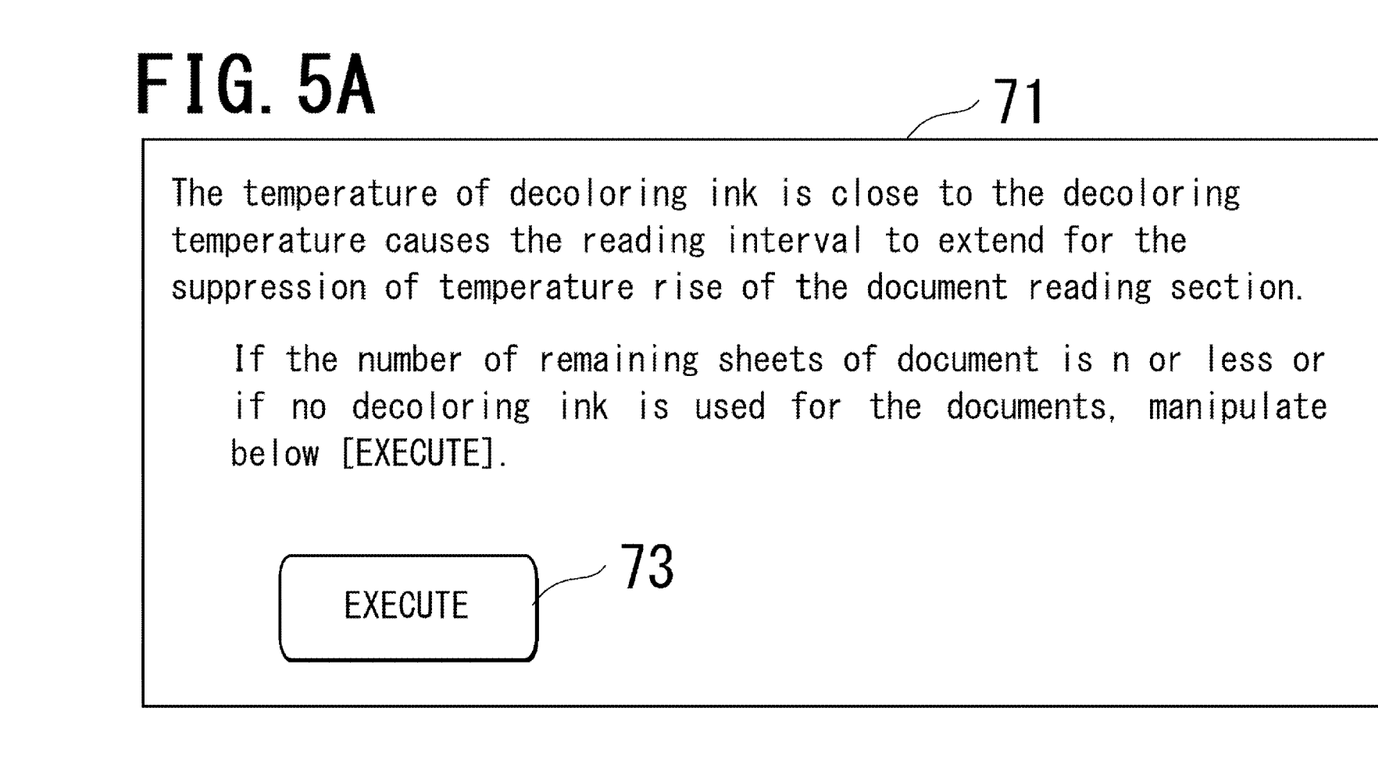
FIG. 5A is a diagram showing an example of a guidance screen generated by a guidance screen generation section shown in FIG. 1.

Next, the guidance screen generation section 63 displays a restriction guidance screen 71 for notifying the user of the execution of the document reading operation at the restriction temperature interval of time as shown in FIG. 5A and the number n of the readable sheets which is calculated in Step A8 (Step A9) and causes the touch panel of the operation section 5 to display them.

In parallel with the processes in Steps A8 and A9, the document reading control section 61 executes the next document reading operation at the restriction temperature interval of time (Step A10) and the control returns to Step A4 to determine whether or not a next document exists. As a result, if the monitoring temperature T is equal to or higher than the restriction temperature threshold value T2 and is concurrently less than the suppression temperature threshold value T1, the document reading operation is executed at the restriction temperature interval of time that is longer than the regular interval of time. Therefore, compared with the document reading operation at the regular interval of time, the period of (the restriction temperature interval of time minus the regular interval of time) becomes a natural cooling period, and the increase of the monitoring temperature T is restricted.

Figure 5B:
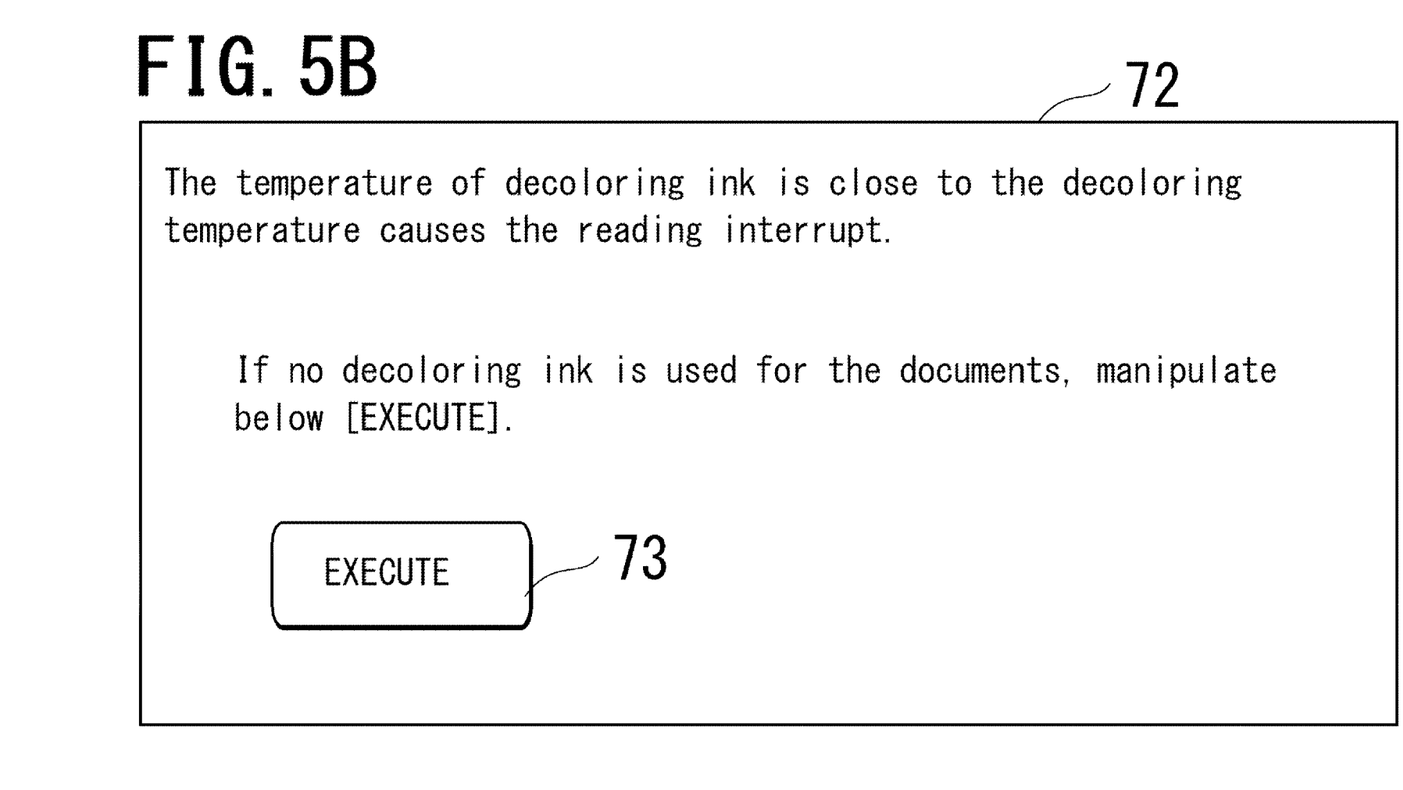
FIG. 5B is a diagram showing another example of the guidance screen generated by the guidance screen generation section shown in FIG. 1.

In Step A2 and Step A7, if the monitoring temperature T is found to be equal to or higher than the interruption temperature threshold value T1, the guidance screen generation section 63 generates a restriction guidance screen 72 for notifying the user of suppression of the document reading operation as shown in FIG. 5B (Step A11) and causes the operation section 5 to display the restriction guidance screen 72 on the touch panel.

In addition, in parallel with step A11, the document reading control section 61 waits for the monitoring temperature T to fall below the specified restart temperature threshold value T3 (step A12) and if the monitoring temperature T becomes less than the restart temperature threshold value T3, the control returns to step A3 to execute the document reading operation. More specifically, the document reading control section 61 interrupts the document reading operation until the monitoring temperature T becomes less than the interruption temperature threshold value T1. As a result, the monitoring temperature T is prevented from rising beyond the interruption temperature threshold value T1, which makes it possible to prevent an unexpected erasure of the print information printed with the erasable ink.

As shown in FIG. 5A and FIG. 5B, on the restriction guidance screen 71 and the interruption screen 72, there is provided an execution key whose execution is suggested when the number of remaining sheets of the document is equal to or less than the number n of readable sheets or when decoloring ink is not used for the document. The execution key 73 is an operation key that instructs an execution of a successive document reading operation at the regular interval of time without considering the monitoring temperature T. If the execution key 73 is operated on the suppression guidance screen 71, the document reading control section 61 executes the document reading operation in a successive manner at the regular interval of time without considering the monitoring temperature T until the documents stacked in the document stacking tray 31 run out. Thus, in a case where the document reading operation is predicted to terminate before an attainment of the interruption temperature threshold value T1, or in a case where no print information to be erased is found even if an attainment of the interruption temperature threshold value T1, operating the execution key 73 makes it possible to continue the document reading operation without having to lower the operation speed.

Figure 6:
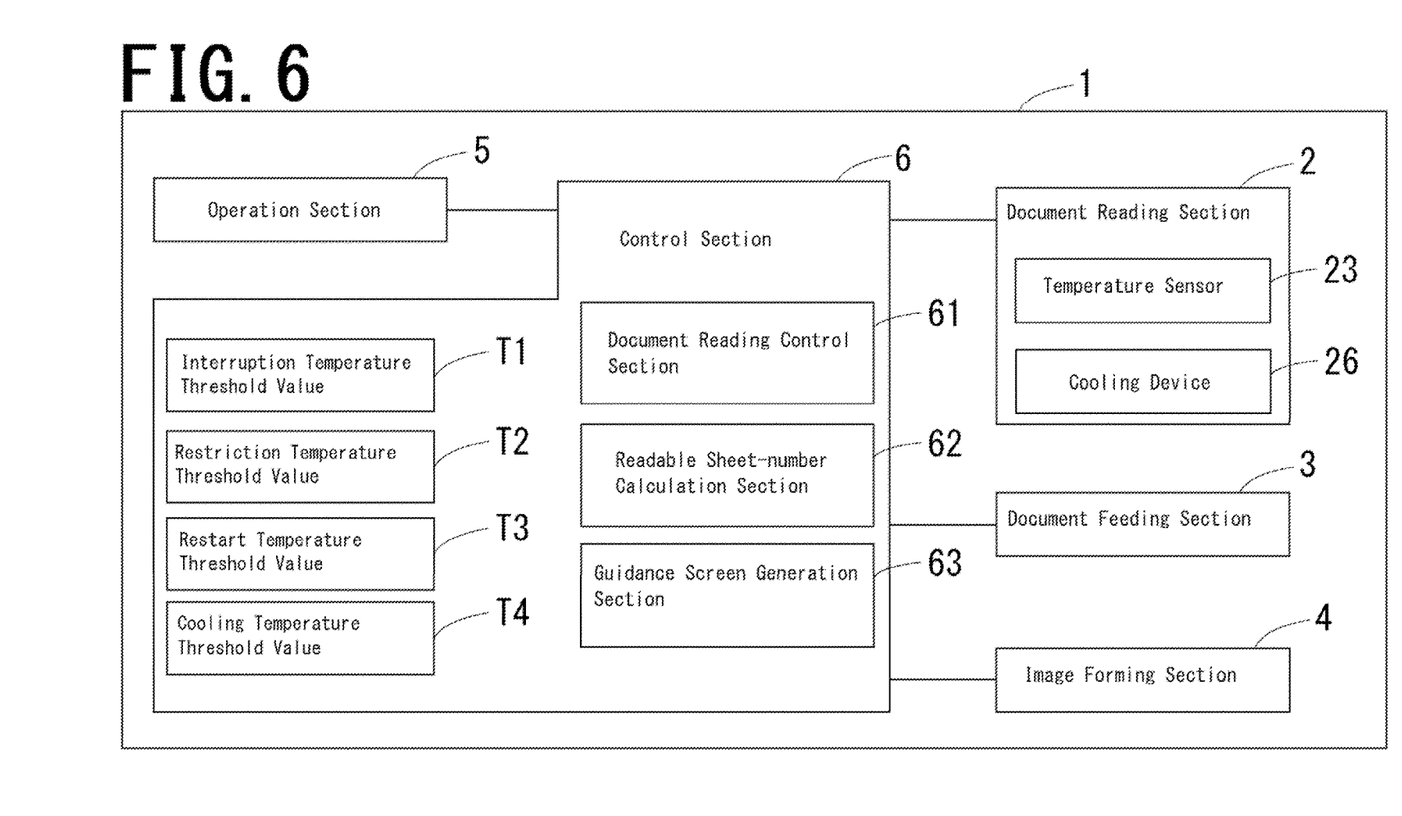
FIG. 6 is a block diagram showing a schematic configuration of another embodiment of the image forming apparatus according to the present disclosure.

As shown in FIG. 6, the document reading section 2 may be provided with a cooling device 26 for cooling the slit plate 22 in a direct or indirect manner. The cooling device 26 can be constituted by, for example, a fan or a Peltier element which blows wind onto the slit plate 22. In addition, if a configuration is established such that the document reading control section 61 causes the cooling device 61 to operate if the monitoring temperature T exceeds a cooling temperature threshold value T4 that is set in advance, which makes it possible to operate the cooling device 26 in an efficient manner. The cooling temperature threshold value T4 may be set, in a suitable manner, to a temperature equal to or lower than the interruption temperature threshold value T1 depending on the degree of the temperature rise of the document reading slit glass 22 and the cooling capacity of the cooling device 26.

It is to be noted that in the present embodiment, although the temperature sensor 23 and the cooling device 26 are provided in the document reading section 2, either of the temperature sensor 23 and the cooling device 26 or the both may be provided in the document feeding section 3.

Further, in the present embodiment, the temperature sensor 23 is configured to detect, in a direct or indirect manner, the temperature of the slit plate 22 arranged in the document feeding path of the document that is fed by the document feeding section 3. However, it may be possible for the temperature sensor 23 to detect, in a direct or indirect manner, the temperature the document feeding path at a position other than the slit plate 22. More specifically, if a light source such as an LED having a small calorific value is used, it is also assumed that the temperature of the position other than the slit plate 22 of the document feeding path becomes higher than that of the slit plate 22. For example, a temperature of the motor, which is the power source of the document feeding mechanism 33, becomes high, which may in some cases, result in the temperature of the document feeding path near the motor becomes high. In such a case, it is preferable to cause temperature sensor 23 to detect, in a direct and indirect manner, the temperature of the document feeding path near the motor.

As described above, the document reading apparatus according to the present embodiment includes the document reading section 2 that reads the print information on the document and the document feeding section 3 that feeds the documents, in a one-by-one manner, which are stacked in the document stacking tray 23. If a document reading instruction is accepted in a state where a plurality of documents are stacked in the document stacking tray 31, the document reading operation in which a single sheet of document is fed by the document feeding section 3 and reading the single sheet of document is executed by the document reading section 2 is executed in a successive manner. The document reading apparatus further includes the temperature sensor 23 for detecting the temperature of the document feeding path of the document that is fed by the document feeding section 3 as the monitoring temperature T and the document reading control section 61 for interrupting the document reading operation until the monitoring temperature T becomes less than the restart temperature threshold value T3 that is set to be equal to or lower than the interruption temperature threshold value T1 if the monitoring temperature T becomes equal to or more than the interruption temperature threshold value T1 that is set to be lower than the decoloring temperature of the erasable ink.

According to this configuration, by setting the interruption temperature threshold T1 to be less than the decoloring temperature of the erasable ink, it is possible to print using the erasable ink without elevating the temperature of the document feeding path beyond the decoloring temperature and unintended erasure of the print information can be prevented.

In an example of typical document reading apparatuses, there is a problem when print information printed using erasable ink is unintentionally erased at the time of reading a document using the document feeding section and the document reading section, which results in that the information cannot be read accurately. In a case where a large number of documents are successively read using the document feeding section and the document reading section, heat due to document conveyance by the document feeding section and heat due to light irradiation in the document reading section are accumulated. Therefore, when the print information printed on the document with erasable ink, there is a possibility that it is erased by the accumulated heat.

However, according to the document reading apparatus of the present disclosure, setting the interruption temperature threshold value to be less than the decoloring temperature of the erasable ink causes the document feeding path of the document that is fed by the document feeding section not rise beyond a color erasing temperature. For this reason, it is possible to provide an effect that is capable of preventing unintentional erasure of the print information printed with the erasable ink.

Further, in the present embodiment, the document reading section 2 reads the print information of the document via the slit plate 22, and the temperature sensor 23 detects, as the monitoring temperature T, the temperature of the slit plate 22 as the document feeding path.

According to this configuration, setting the interruption temperature threshold value T1 to be less than the decoloring temperature of the erasable ink results in that the slit plate 22 fails to rise beyond the decoloring temperature, which makes it possible to prevent an unintended erasure of the print information printed with the erasable ink.

Furthermore, the present embodiment is configured to include the guide screen generation section 63 which notifies of an interruption of the document reading operation if the monitoring temperature T becomes equal to or higher than the interruption temperature threshold value T1 and on which the execution key 73 is allocated for issuing an instruction to execute the successive document reading operation at the regular interval of time, and the operation section 5 that has the display part on which the interruption guidance screen 72 is displayed. Then, when receiving an operation of the execution key 73, the document reading control section 61 continues to read the document at the regular interval of time without taking into consideration of the monitoring temperature T until the documents stacked in the document stacking tray 31 run out.

According to this configuration, if there is no print information to be deleted even when the interruption temperature threshold value T1 is reached, that is, if no document is found which uses decoloring ink, operating the execution key 73 makes it possible to continue the document reading operation without having to lower the operation speed.

Further, in the present embodiment, if the monitoring temperature T is less than the restriction temperature threshold value T2 that is lower than the interruption temperature threshold value T1, the document reading control section 61 continuously executes the document reading operation at the specified regular interval of time. If the monitoring temperature T is equal to or higher than the restriction temperature threshold value T2 and is concurrently lower than the interruption temperature threshold value T1, the document reading operation is successively executed at the restriction temperature interval of time that is longer than the regular interval of time.

According to this configuration, increasing the interval of time between document reading operations makes it possible to cause the slit plate 22 to cool in a natural way, thereby restricting the temperature rise of the slit plate 22.

Furthermore, the present embodiment is configured to include the guide screen generation section 63 which notifies of an interruption of the document reading operation if the monitoring temperature T is equal to or higher than the restriction temperature threshold value T2 and is concurrently less than the interruption temperature threshold value T1, and generates the interruption guidance screen 72 on which the execution key 73 is allocated for issuing an instruction to execute the successive document reading operation at the regular interval of time, and the operation section 5 that has the display part on which the restriction guidance screen 72 is displayed. Then, when receiving an operation of the execution key 73, the document reading control section 61 continues to read the document at the regular interval of time without taking into consideration of the monitoring temperature T until the documents stacked in the document stacking tray 31 run out.

According to this configuration, if there is no print information to be deleted even when the interruption temperature threshold value T1 is reached, that is, if no document is found which uses decoloring ink, operating the execution key 73 makes it possible to continue the document reading operation without having to lower the operation speed.

Furthermore, in the present embodiment, there is provided the readable sheet number calculating section 62 that calculates the number n of sheets of document whose temperatures reach the interruption temperature threshold value T1 if the monitoring temperature T rises due to a successive execution of the document reading operation at the regular interval of time based on the monitoring temperature T until reaching the interruption temperature threshold value T1. Then, the readable sheet number calculating section 62 that calculates the number of sheets whose temperatures reach the interruption temperature threshold value T1 as the readable sheet number n.

Then, the guidance screen generation section generates a suppression guidance screen 71 for notifying the number n of readable sheets.

According to this configuration, if a completion of the document reading operation is anticipated before the monitoring temperature T reaches the interruption temperature threshold value T1, it is possible for the document reading operation to continue at the regular interval of time while the operation speed is not lowered by executing the document reading operation at the temperature restriction.

Furthermore, in the present embodiment, the cooling device 26 for cooling the document feeding path is provided. According to this configuration, it is possible to effectively suppress the temperature rise of the document feeding path by causing the cooling device 26 to cool the document feeding path.

Further, in the present embodiment, if the monitoring temperature T reaches the cooling temperature threshold value T4 that is set to be equal to or less than the interruption temperature threshold value T1, the cooling device 26 starts operation and cools the document feeding path.

According to this configuration, it is possible to operate the cooling device 26 in an effective manner.

It is to be noted that the present disclosure is not limited to the above embodiments, and it is apparent that each embodiment can be appropriately changed or modified within the scope of the technical idea of the present disclosure. Further, the number, the position, the shape, and the like of the above-described constituent members are not limited to those in the above embodiment, but may be modified in a suitable manner for implementing the present disclosure. In each Figure, the same reference numerals are given to the same constituent elements.

What is claimed is:

1. A document reading apparatus, comprising:
    a document reading section reading print information on documents; and
    a document feeding section feeding the documents from a state where the documents are stacked in a document stacking tray, in a one-by-one manner, to the document reading section,
    wherein if a document reading instruction is accepted in the state where the documents are stacked in the document stacking tray, a document reading operation is executed successively in which the document feeding section feeds a sheet of document to the document reading section to undergo reading operation by the document reading section,
    and wherein the document reading apparatus further comprises
    a temperature sensor detecting a temperature of a document feeding path along which a document moves that is fed by the document feeding section as a monitoring temperature;
    a document reading control section causing an interruption of the document reading operation, if the monitoring temperature becomes equal to or more than an interruption temperature threshold value that is set less than a color erasing temperature of erasable ink, until the monitoring temperature becomes less than a restart temperature threshold value that is set to be equal to or less than the interruption temperature threshold value; and
    an interruption guide screen generation section noticing of the interruption of the document reading operation if the monitoring temperature becomes equal to or more than the interruption temperature threshold value and generating a screen on which an execution key appears which causes the document reading control section to conduct the successive operation at a regular interval of time and a display section on which the interruption guide screen is displayed, wherein if an operation of the execution key is accepted, the document reading control section continuously executes the document reading operation at the regular interval of time without considering the monitoring temperature until there is no document stacked in the document stacking tray.

2. The document reading apparatus according to claim 1, wherein the document reading section reads the print information through a slit plate, and the temperature sensor detects a temperature of the slit plate as the monitoring temperature by regarding the slit plate as the document feeding path.

3. The document reading apparatus according to claim 1, further comprising a cooling device that cools the document feeding path.

4. The document reading apparatus according to claim 3, wherein the cooling device starts an operation to cool the document feeding path when the monitoring temperature reaches a cooling temperature threshold value set to be equal to or lower than the interruption temperature threshold value.

5. An image forming apparatus comprising:
    a document reading apparatus according to claim 1; and
    an image forming section that forms an image based on image data acquired by the document reading apparatus.

6. A document reading apparatus, comprising:
    a document reading section reading print information on documents; and
    a document feeding section feeding the documents from a state where the documents are stacked in a document stacking tray, in a one-by-one manner, to the document reading section,
    wherein if a document reading instruction is accepted in the state where the documents are stacked in the document stacking tray, a document reading operation is executed successively in which the document feeding section feeds a sheet of document to the document reading section to undergo reading operation by the document reading section,
    and wherein the document reading apparatus further comprises
    a temperature sensor detecting a temperature of a document feeding path along which a document moves that is fed by the document feeding section as a monitoring temperature; and
    a document reading control section causing an interruption of the document reading operation, if the monitoring temperature becomes equal to or more than an interruption temperature threshold value that is set less than a color erasing temperature of erasable ink, until the monitoring temperature becomes less than a restart temperature threshold value that is set to be equal to or less than the interruption temperature threshold value;
    and wherein the document reading control section conducts the successive document reading operation at a specified regular interval of time if the monitoring temperature is less than a restriction temperature threshold value that is set to be less than the interruption temperature threshold value, while the document reading control section conducts the successive document reading operation at a restrictedly defined interval of time that is set to be longer than the specified regular interval of time if the monitoring temperature is equal to or more than the restriction temperature threshold value and is less than the interruption temperature threshold value.

7. The document reading apparatus according to claim 6, further comprising a guide screen generation section notifying of an execution of the document reading operation if the monitoring temperature is equal to or more than the restriction temperature threshold value and is less than the interruption temperature threshold value and generating a restriction guide screen on which an execution key appears that causes the document reading control section to conduct the successive operation at the regular interval of time and a display section on which the restriction guide screen is displayed, wherein if an operation of the execution key is accepted, the document reading control section continuously executes the document reading operation at the regular interval of time without considering the monitoring temperature until the documents stacked in the document stacking tray run out.

8. The document reading apparatus according to claim 7, further comprising a readable sheet number calculating section counting the number of the documents that are read before the monitoring temperature reaches the interruption temperature threshold value as the number of readable documents based on the monitoring temperature before reaching the interruption temperature threshold value, if the monitoring temperature rises by the execution of the successive document reading operation,
   wherein the guide screen generating section generates the restriction guide screen that notifies of the number of readable documents.

9. An image forming apparatus comprising:
a document reading apparatus according to claim 6; and
an image forming section that forms an image based on image data acquired by the document reading apparatus.

* * * * *